(12) United States Patent
Levin et al.

(10) Patent No.: US 11,603,513 B2
(45) Date of Patent: Mar. 14, 2023

(54) LIGHT EMITTING FLUID DECANTING DEVICE AND METHOD OF LIGHT-TREATING A FLUID

(71) Applicant: Vine Technology Inc., Cheyenne, WY (US)

(72) Inventors: Dean Levin, Redondo Beach, CA (US); Sandra Davis, Rancho Palos Vendes, CA (US)

( * ) Notice: Subject to any disclaimer, the term of this patent is extended or adjusted under 35 U.S.C. 154(b) by 0 days.

(21) Appl. No.: 16/685,441

(22) Filed: Nov. 15, 2019

(65) Prior Publication Data

US 2020/0157482 A1    May 21, 2020

Related U.S. Application Data

(60) Provisional application No. 62/768,043, filed on Nov. 15, 2018.

(51) Int. Cl.
| | | |
|---|---|---|
| *C12H 1/16* | (2006.01) | |
| *F21V 33/00* | (2006.01) | |
| *A47G 23/02* | (2006.01) | |
| *B01F 23/2361* | (2022.01) | |
| *F21Y 115/10* | (2016.01) | |

(52) U.S. Cl.
CPC ......... *C12H 1/165* (2013.01); *A47G 23/0241* (2013.01); *B01F 23/2361* (2022.01); *F21V 33/0024* (2013.01); *F21Y 2115/10* (2016.08)

(58) Field of Classification Search
CPC ... F21V 29/506; F21V 33/0024; C12H 1/165; A47G 23/0241; B01F 3/04794
See application file for complete search history.

(56) References Cited

U.S. PATENT DOCUMENTS

| | | | | |
|---|---|---|---|---|
| 5,998,925 A | * | 12/1999 | Shimizu | H05B 33/14 313/503 |
| 2006/0094137 A1 | * | 5/2006 | Yan | H01L 33/486 257/E25.02 |
| 2006/0146533 A1 | * | 7/2006 | Chen | F21K 9/68 362/800 |
| 2008/0013312 A1 | * | 1/2008 | Wu | H05B 45/20 362/231 |
| 2011/0143000 A1 | * | 6/2011 | Fiset | C12H 1/165 426/248 |
| 2015/0329809 A1 | * | 11/2015 | Cifaldi | B01F 33/45 261/93 |
| 2016/0271572 A1 | * | 9/2016 | Li | C12G 1/00 |
| 2017/0165618 A1 | * | 6/2017 | Johansson | B01F 33/5011 |
| 2018/0049571 A1 | * | 2/2018 | Lu | A47G 19/12 |

* cited by examiner

*Primary Examiner* — Diane I Lee
*Assistant Examiner* — Nathaniel J Lee
(74) *Attorney, Agent, or Firm* — Eandi Fitzpatrick LLP (57) ABSTRACT

The present invention discloses a device for light-treating a fluid having base having an internal hollow portion for housing electronic components, a transparent medium on a top of portion of the base on which a fluid vessel rests, a light emitting element (LEE) for producing light located in the base and positioned toward the top portion of the based where the fluid vessel rests, a processor in communication with the LEE, a user interface for inputting characteristics about the fluid to be treated, wherein the processor, based on the input, controls at least one of the intensity or duration of the light produced by LEE. A system and method for treating a fluid is also disclosed.

16 Claims, 10 Drawing Sheets

LIGHT EMITTING FLUID DECANTING DEVICE AND METHOD OF LIGHT-TREATING A FLUID

CROSS-REFERENCE TO RELATED APPLICATIONS

This application claims the benefit of U.S. Provisional Application Ser. No. 62/768,043 entitled Light Emitting Fluid Decanting Device and Method of Decanting filed on Nov. 15, 2018, the entire contents of which are incorporated herein by reference for all purposes.

FIELD OF THE INVENTION

The present invention relates generally to the field of fluids processing, namely, wine, distilled spirits, vinegars, juices and coffee processing technologies. More specifically, the present invention relates to a light emitting decanting and aeration device.

BACKGROUND

Aging of wine, distilled spirits, vinegars, juices and coffee and its ability to potentially improve in quality distinguishes wine, distilled spirits, ciders, mixed drinks, and coffee from most other consumable goods. While wine is perishable and capable of deteriorating, complex chemical reactions involving a wine's sugars, acids and phenolic compounds (such as tannins) can alter the aroma, color, mouth-feel, and taste of the wine in a way that may be more pleasing to the taster. The ability of a wine to age is influenced by many factors including grape variety, vintage, vinicultural practices, wine region and winemaking style. The ability of a distilled spirits (including mixed drinks) to age is influenced by many factors including ingredient variety, vintage, fermentation practices, region and spirits making style. The condition that the storage of wine, distilled spirits and coffee after bottling can also influence aging of the wine, distilled spirits and coffee which may require significant time and financial investment.

Most wine and distilled spirits producers are aware of the chemistry whereby light does affect the product. Light is a form of radiation which conveys energy. Light at shorter wavelengths, which include the Ultraviolet and blue (lower) portion of the spectrum, carries more energy to break apart wine, distilled spirits pigments thus creating oxidative reactions over time than the longer wavelengths found in the red portion of the spectrum, for example. It has been thought by experts that all light is "bad" for wine, and that the result of these reactions prematurely ages the wine by producing so called "light-struck" flavours and aromas. The damaging fragment of certain UV wavelength spectrum activates chemical reactions of the sulphur compounds, which either naturally occur in wine or are added to wine by the producers. Like wine, nearly all dark distilled spirits like scotch, whiskey and rums are affected by sunlight. These particular distilled spirits result in shifting both taste and a lighter distilled spirits colour when exposed to harmful sun or UV light.

Some wines are more susceptible to degradation by light than others based on the tannins in the wine. Tannins are natural inhibitors of the lightstrike reactions and while they are present in most wines, they typically occur in higher concentrations in red wines. The damaging reactions are a detectable loss in quality and may occur in a matter of hours whether the wines are fancy, fragile, every day, or sturdy. Light exposure by itself can elicit color changes in wine. Devastating effects on wine color and stability is the combination of high temperatures with low wavelength and UV light exposure.

Decanting takes more time and is known to generally produce a far better tasting result compared to simple aeration. Decanting is the process of letting a wine mix with all the possible oxygen available in the air. The biggest influence for oxidation is the amount of wine surface in contact with air after opening and pouring. While white wines are affected more easily by oxidation than red wines, red wines have more color pigmentation than white wines. This extra color pigmentation in the wine acts as an anti-oxidant, preserving the wine's color, aroma, and flavor. Compounds such as Sulphur Dioxide are sometimes added to the wine by winemakers to protect the wine from oxidation and bind with some of the oxidation products to reduce the organoleptic (sensory) effect. When a wine becomes oxidized it will turn towards brown—just as a cut apple left on a bench top. White wines often start to show an amber tint and red wines will start to develop a brown edge when viewed in a glass that is tilted.

When decanting, one could notice a dramatic increase in subtlety and complexity. If one has the luxury of time and continues tasting the wine over a period of hours, it most always keeps evolving and improving. When one decants a bottle of wine, distilled spirits and coffee two things happen: First, when the wine, distilled spirits and coffee is poured into a decanter, the resulting agitation causes the wine, distilled spirits and coffee to mix with oxygen, enabling it to develop and come to life at an accelerated pace. Second, the traditionally slower the decanting process allows wine, particularly older wine, to separate from its sediment, which, if left mixed within the wine, can impart a very noticeable bitter, astringent flavor.

All wines strongly absorb light energy in the upper UV end of the spectrum. Normal sunlight, for example, contains both these wavelengths and is thus capable of exciting the riboflavin in wine promote the reactions causing light-struck flavors. Rose and red wines tend to absorb at the shorter wavelength end of the visual range (the blue, green, and orange) allow only the redder colors to pass.

Currently, traditional glass decanters take several hours for decanting the wine in a decanter. For example, Barolo and Barbaresco wine could take 6-8 hours for bottles up to 20 years old and 3-4 hours for older wines for the decanting process. Bordeaux wine could take 1-2 hours for bottles up to 20 years old for the decanting process. Burgundy wine could take 1-2 hours for bottles up to 10 years old and shortly before serving for older wines. California cabernet wine takes 1-2 hours for bottles up to 20 years old and shortly before serving for older wines. Rhône takes 2-3 hours for bottles up to 10 years old and 1 hour for older wines. The traditional glass decanters are not able to decant the wine quickly or thoroughly and fail to acquire complete and precise flavor.

Different technologies are available in the market for the wine and spirits decanting process. The known art for momentary aeration, for example a Vinturi®, is the most popular solution and requires a handheld above glass while pouring wine through top of the aerator. As the wine flows through the aerator, it momentarily breathes as bubbles are sent through it. Air bubble injection is one of the best marketed device approaches delivers arbitrary aeration by forcing air bubbles randomly into a decanter. The challenge is that the air bubbles are most random and so the taste leaves what one might call hot and cold spots in the decanted wine. Other decanters use a loose magnetic bean and a variable speed motor to stir the wine to create a decanted wine. However, the known art fails to deliver a completely satisfying result in the wine decanting process none approached the delivery of a fully decanted wine, distilled spirits, vinegars, juices or coffee without altering the winemakers intended personality.

Therefore, there is a need for a wine, distilled spirits, vinegars, juices and coffee decanting device that "ages" wine in a matter of minutes.

SUMMARY OF THE INVENTION

The present invention generally discloses wine, distilled spirits and coffee processing technologies. Further, the present invention discloses a light emitting wine decanting device including the decanter system.

The device is configured to generate a decantation and "aging" of the wine, distilled spirits, vinegars, juices and coffee, and also increase the pH particular as it relates to juices. In one embodiment, the device is adaptable to mix the wine, distilled spirits and coffee in the decanter with the oxygen in the air via a movement component to trigger oxidation and evaporation of chemical compounds in the wine, distilled spirits distilled spirits, vinegars, juices and coffee.

In another embodiment, a light emitting device is further provided at the base and is controlled by a processor or microcontroller. The light emitting device produces a very minimal amount of heat, ensures the fluid (e.g., wine) is insulated from the minimal amount of heat, and emits or radiates in a predefined or predetermined narrowband of wavelength, and in optional embodiments, is adjustable based on the variable or spirit. The device prevents harmful ultraviolet (UV) lights from the light source.

Further, in an embodiment, the device produces a complete and precise flavor is provided in conjunction with the light emitting device to accelerate the reduction of sulfites, particularly sulfur dioxide ($SO_2$), and removes unpleasant odor from the flavor whilst treating the wine using high wavelength light.

In one embodiment, the decanter is adapted to transparent visible light and accomplishes by allowing approximately 90% of the non-UV light to pass through it. The wine, distilled spirits, vinegars, juices and coffee could stay in the decanter for hours without spoiling and stay until it approaches being exposed to as much air as it needs. In one embodiment, the decanter could be a glass decanter. In some embodiments, the decanter could be a simple carafe.

In one embodiment, the device comprises a base having an internal hollow portion for housing electronic components, a transparent medium on a top of portion of the base on which a fluid vessel rests, a light emitting element (LEE) located in the base and positioned toward the top portion of the based where the fluid vessel rests, the LEE being capable of emitting light, a processor in communication with the LEE, a user interface for inputting characteristics about the fluid to be treated. The the processor, based on the input, controls at least one of the intensity or duration of the light produced LEE.

In another embodiment, a system for light-treating a fluid is provided. The system comprises a smart device associated with a user, wherein the smart device comprises a graphical user interface (GUI) for inputting characteristics about the fluid to be treated, a network in communication with smart device via wireless protocol, a device to light-treat a fluid comprising a base having an internal hollow portion for housing electronic components, a transparent medium on a top of portion of the base on which a fluid vessel rests, a light emitting element (LEE) located in the base and positioned toward the top portion of the based where the fluid vessel rests, the LEE being capable of emitting light, and a processor in communication with the LEE. The processor, based on the input from the GUI, controls at least one of the intensity or duration of the light produced by the LEE.

In another embodiment, a method for light-treating a fluid is provided. The method comprises placing a fluid in a vessel proximate a base, applying a light to the fluid in the vessel from a base, wherein the base has having an internal hollow portion for housing electronic components, inputting, via a user interface, characteristics about the fluid to be treated, controlling, using the processor, at least one of the intensity or duration of the light produced LEE. The step of applying the light comprises blue light from a first LED and yellow light from second LEDs.

In embodiments, the magnetic field generated by the variation magnetic field generator drives the movement component to move in the wine, distilled spirits, vinegars, juices and coffee so that a gas channel for gas inlet is formed in the wine, distilled spirits, vinegars, juices and coffee and the movement component beats air entering the gas channel into the wine, distilled spirits, vinegars, juices and coffee.

In one embodiment, the device comprises at least one light emitting device (LED), and a phosphor layer. In one embodiment, the LEE with the phosphor could be disposed within the base of the device. In one embodiment, the LEE is a blue light LEE. In one embodiment, the device provides a low visible light via the LEE disposed within the base of the device. In one embodiment, the spectrum of the low visible light. In one embodiment, the LEE generate a minimum amount of heat while emitting the light and an insulator is provided. In one embodiment, the LEE emits or radiates in a predefined narrowband of wavelength so that the light passes through the decanter. In one embodiment, the phosphor layer is deposited on the LEE. The combinations of the blue and yellow photons generates white light. The emission spectrum of blue light from the LEE through the phosphor layer generates a white light spectrum. In one embodiment, the device could be illuminated in, but not limited to, white light. In one embodiment, the white light could be produced by combining the wavelengths of yellow and blue lights.

In one embodiment, the spectrum of the white light is produced by the gallium nitride (GaN) or indium gallium nitride (InGaN) blue light with the cerium doped yttrium aluminium garnet (Ce:YAG) phosphor.

In one embodiment, the device further comprises a velocity decanting technology with an optimum speed rotation (OSR) for decanting the wine, distilled spirits, vinegars, juices and coffee quickly and get a complete and precise flavor to the wine, distilled spirits, vinegars, juices and coffee. In one embodiment, the velocity decanting technology could improve the decanting process of the wine, distilled spirits, vinegars, juices and coffee in the decanter.

In one embodiment, the velocity decanting technology with optimum speed rotation of the device is configured to rotate the decanter at optimum speed. In one embodiment, the optimum speed of the decanter could achieve the taste and improve the flavor and quality of the wines, distilled spirits, vinegars, juices and coffee.

In one embodiment, the velocity decanting technology increases the exposure time of the wine, distilled spirits, vinegars, juices and coffee in order to get more oxygen and cause oxidation and evaporation of chemical compounds in the wine, distilled spirits, vinegars, juices and coffee.

Other objects, features and advantages will become apparent from the following detailed description. It should be understood, however, that the detailed description and the specific examples, while indicating specific embodiments of the invention, are given by way of illustration only, since various changes and modifications within the spirits and scope of the invention will become apparent to those skilled in the art from this detailed description.

BRIEF DESCRIPTION OF THE INVENTION

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described are shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

As used herein, the term "fluid" may refer to any foodstuff fluid in a vessel which is being decanted and treated with light or photons, including but not limited to wine, distilled spirits, vinegars, juices or coffee.

Figure 1:
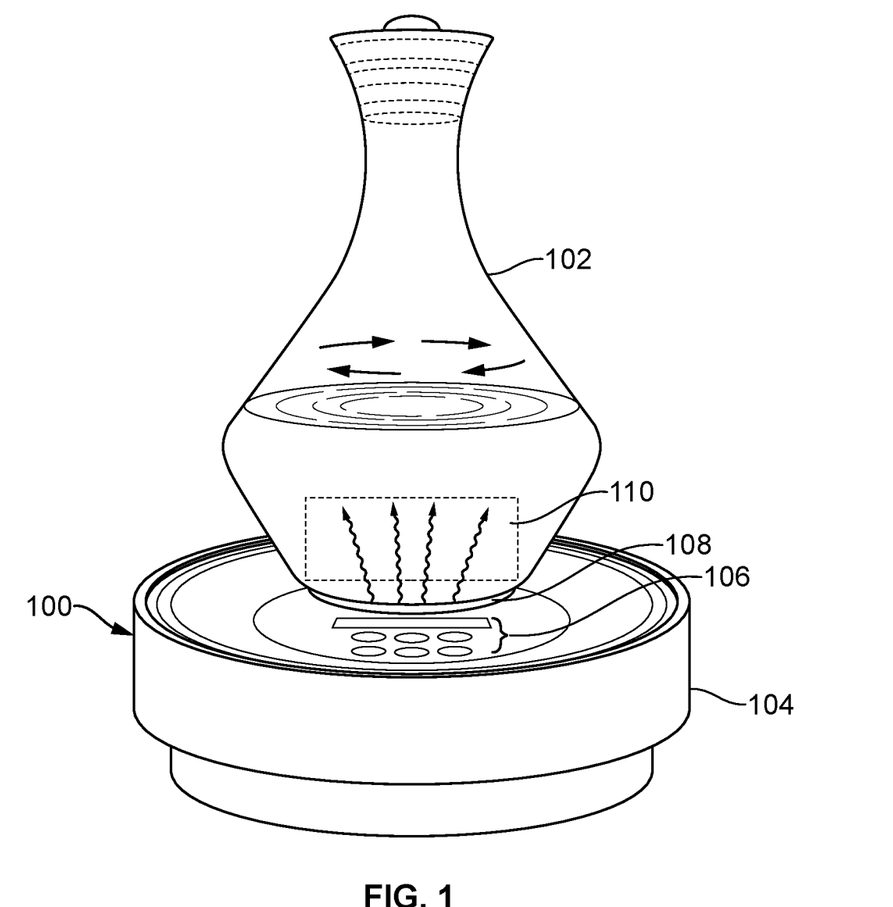
FIG. 1 shows a perspective view of a light emitting fluid decanting device with a decanter, according to an embodiment.

Referring to FIG. 1, a perspective view of a light emitting wine, distilled spirits or coffee decanting device 100 with a decanter 102 is illustrated. In one embodiment, the device 100 is configured to generate a decantation of the wine, distilled spirits and coffee to simulate the aging of wine, distilled spirits and coffee within a matter of minutes. In one embodiment, the device 100 is adaptable to mix the wine, distilled spirits and coffee, distilled spirits and coffee in a fluid holding vessel such as a wine decanter 102 with the oxygen in the air via a movement or a stirring component to trigger oxidation and evaporation of certain chemical compounds in the wine, distilled spirits and coffee, distilled spirits and coffee, while a light emitting device emits a predetermined wavelength of light to produce a photonic effect on the fluids described herein.

In one embodiment, a fluid holding vessel such as the wine decanter 102 is positioned on an upper portion of the device 100. The decanter 102 is transparent, adapted to allow visible light to pass through at least a bottom portion of the decanter 102. In one embodiment, the decanter 102 has a film on the bottom that allows approximately 90% of light at or above approximately 350 nm wavelength to pass therethrough. The wine, distilled spirits and coffee, distilled spirits and coffee may be stored in the decanter 102 for hours without spoiling and stored until it approaches being exposed to as much air as it needs.

In one embodiment, the device 100 comprises base 104 (shown more detail with reference to FIG. 2), user interface (UI) 106, transparent medium 108 that allows photons 110 having a predetermined amount of energy to pass therethrough. In embodiments, the transparent medium 108 may be transparent, opaque, or translucent.

Figure 2:
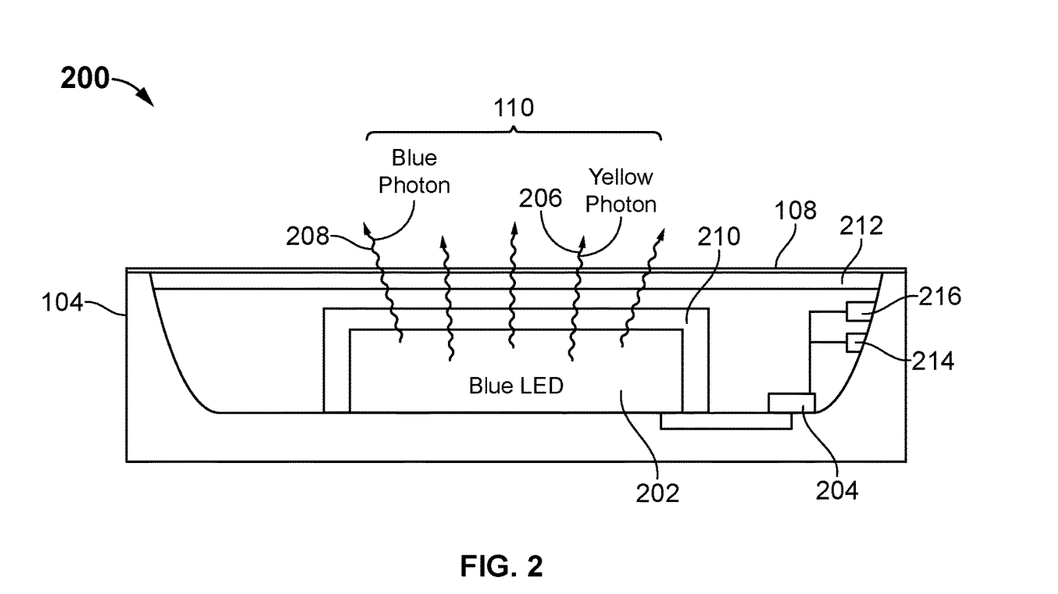
FIG. 2 shows a sectional view of a light emitting fluid decanting device, according to an embodiment.

Referring to FIG. 2, a sectional view of the base 104 is shown with some of the internal components shown therein at 200. A light emitting element 202 (LEE) is connected to a microcontroller 204. The LEE comprises a phosphor layer 210 disposed thereon. The light emitting element 202 may comprise a light emitting diode (LED), but may be any light emitting device in optional embodiments as well. In one embodiment, the LEE 202 with the phosphor layer 210 is disposed within the base 104 of the device 100. Optionally, the phosphor layer 210 is deposited on the LEE 202. In one embodiment, the LEE 202 is a blue light LED. In one embodiment, LEE 202 provides low visible light via the LEE 202 disposed within the base 104 of the device 100. In one embodiment, the spectrum of the low visible light is in a range from 450 nm to 600 nm. The LEE 202 generates a minimum amount of heat while emitting the light, but to further ensure that heat does affect the wine, an insulation layer 212 is provided between the LEE and the medium 108. The insulation layer 212 may be formed of a transparent material that allows all light incident to pass through without changing the characteristics of the light or photons In one embodiment, the LEE 202 emits or radiates in a predefined narrowband wavelength such that the light passes through phosphor layer 210, the insulation layer 212, and the medium 108 to reach the decanter 102 to age the wine, distilled spirits and coffee, to a desired level.

A microcontroller or processor 204 is in electronic communication with the LEE 202 that is used to control and operate the LEE 202, a power source, for example, a battery 214, wireless communication interface 216, and the UI 106. In one embodiment, the microcontroller 204 is a small computer or processor on a single integrated circuit chip and comprises one or more central processing units (CPUs) along with memory and programmable input/output peripherals. In optional embodiments, a different computing device may be used to operate the electronic components. The microcontroller 204 may also be connected to a user's smartphone or other smart device a wireless communications device through the use of WIFI, Bluetooth® or other wireless means to allow the user to control the insanity of the LEE 202 based on the type of wine or spirit that is treated or aged with the light. Furthermore, the microcontroller 204 may be loaded with predetermined values based on a predetermined list of varietals such that a user may select a varietal, and the microcontroller sets the LEE to the optimum intensity, wavelength and time to treat that particular varietal to optimize taste and softness.

In embodiments, the combinations of the blue (435-500 nm) and yellow light (565-590 nm) may generate white light. The emission spectrum of blue light from the LEE 106 through the phosphor layer 108 generate a white light spectrum.

Figure 3:
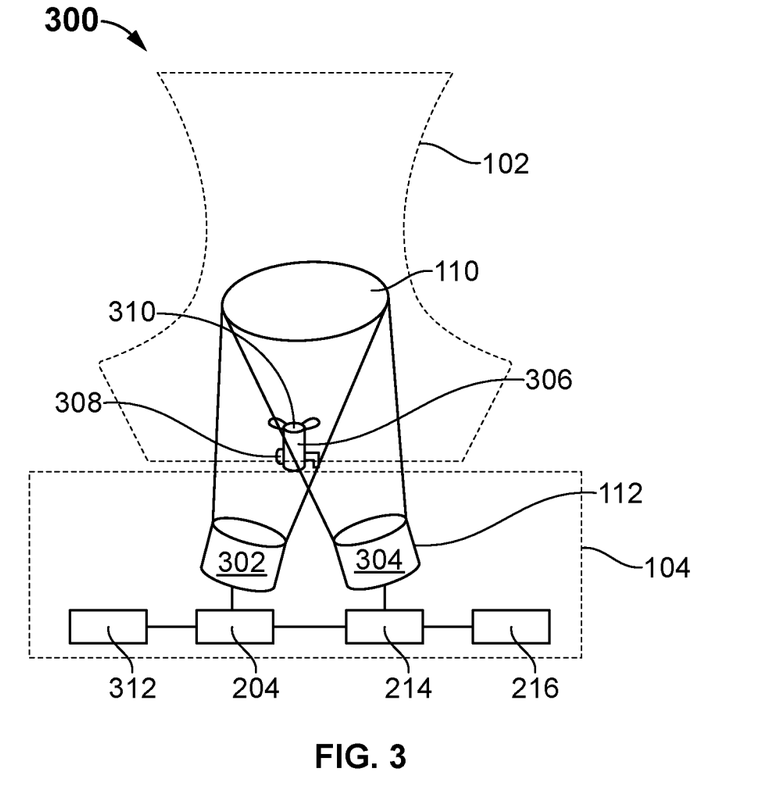
FIG. 3 shows a front internal view of the base according to an embodiment.

Referring to FIG. 3, a front view of the LEE 202 together with other internal components are shown. In this embodiment, the LEE comprises two LEDs 302 and 304. In one embodiment, the device 100 may illuminate in the white light spectrum, while in others, the white light may be produced by combining the wavelengths of yellow LED 302 and blue LED 304. The emission spectrum of blue light from the LED 106 through the phosphor layer 108 generates a white light spectrum. The phosphor layer absorbs some of the blue light emanating from a blue LED and re-emit yellow light, so that white light is produced as a mix of the blue light and yellow light. The white-light quality is sensitive to the thickness, concentration and location of the phosphor layer.

In one embodiment, the device combines the light treatment of the liquid with a decanting process via impeller 306 and the variation magnetic field generator in the device 100 is configured to generate a vortex in the fluid in the decanter 102. In one embodiment, the impeller 306, which is connected to a drive shaft 310 that is powered by microcontroller 214 and a motor 312 to produce a swirling effect thereby increasing the contact between the wine, distilled spirits and coffee, distilled spirits and coffee and air, and implementing a quick decanting effect. The impeller 306 may be run by a motor 312, or a variation magnetic field generator that generates the variation magnetic field to create a swirling effect thereby increasing contact between the wine and air.

Figure 4:
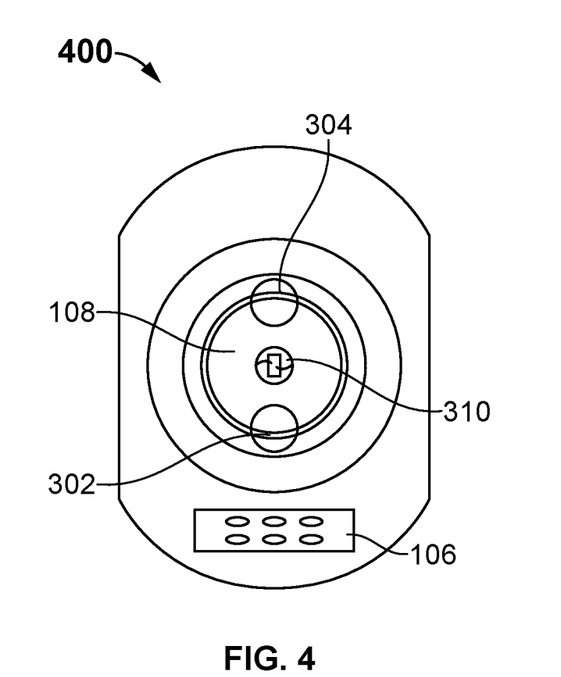
FIG. 4 shows a top view of the device according to an embodiment.

Referring now to a FIG. 4 shows a top view of the device with no decanter thereon according to an embodiment. From the top view, the base 104, UI 106, transparent medium 108, LEDs 302 and 304, and impeller 310 can be seen at reference numeral 400. As shown and in operation, the use may place the decanter 102 on the transparent medium 108, which will communicate with a drive shaft and the impeller to create a vortex in the fluid upon the user initiation via the UI. In optional embodiments, the impeller may be connected to the decanter itself and communicate with the based via drive shaft 310 to provide the motive force of the impeller.

Figure 5:
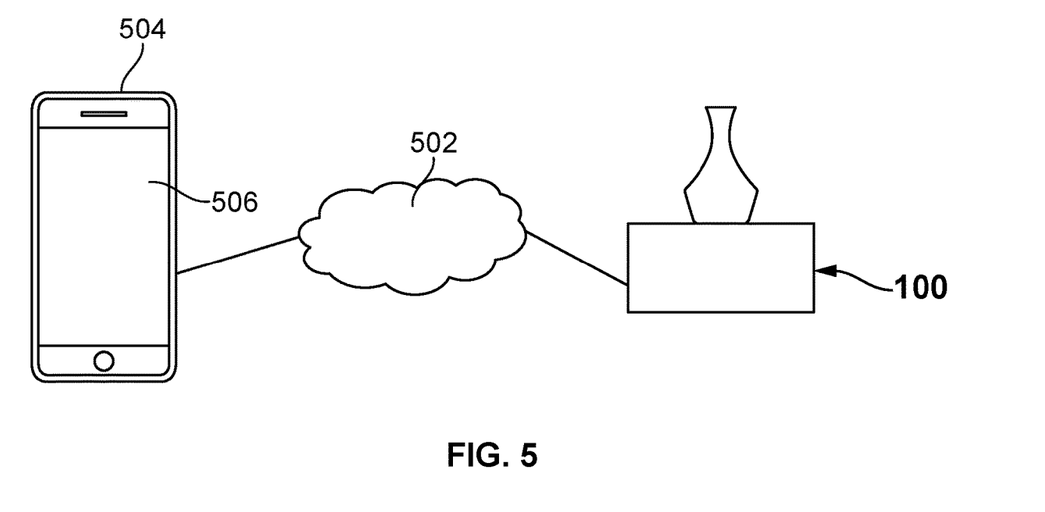
FIG. 5 shows system diagram of the device connected to a network in according to an embodiment.

Referring now to FIG. 5, a system diagram is shown at 500. In an embodiment, a user's smartphone 504 may be in communication with the device 100 via network 502. In some embodiments, the network is at least anyone of a Local Area Network, a Wide Area Network, a Wireless Network, a telecommunication network, a mobile network, Bluetooth® or the Internet. In this way, a user may use his or her cell phone to connect to the device 100 and use the phone graphical user interface (GUI) 506 to input fluid parameters, which as fluid type, varietal, personal preference, and the like.

Figure 6:
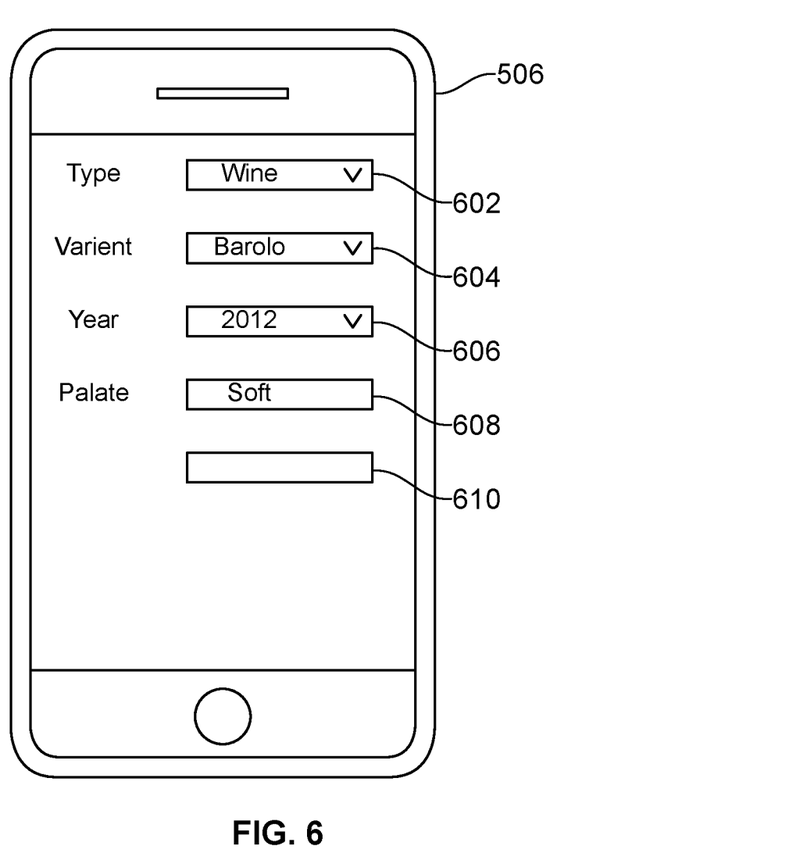
FIG. 6 shows a graphical user interface according to an embodiment.

FIG. 6 shows an exemplary GUI of FIG. 5. In operation, once the user connects to the device via Bluetooth® for example, and the user may use a mobile application downloaded from a mobile application store to select a series of parameters, each of which influence at least two components: The motor 312 and the LEE 202. A few exemplary parameters are shown, namely, Fluid Type 602, Varietal Type 604, Year or Vintage 606, and User Palate 608. Parameter N 610 is shown for all other parameters not shown that are in the purview of the present invention.

In exemplary embodiments, in operation, a user may select a fluid type such as Wine, and Varietal such as Barolo, and the Year such as 2012. The user's palate may be chosen as well (common palate vs. unique palate). Once the information is received from the user, it may be processed and send to the device microcontroller, which will in turn control a variety of parameters for the motor including but not limited to speed of the impeller and the amount of time the fluid is decanted for (i.e., how long the vortex should be created for to ensure best taste). The microcontroller or processor further may control parameters of the LEE including but not limited to time, intensity, and color of the light depending upon the fluid.

Figure 7:
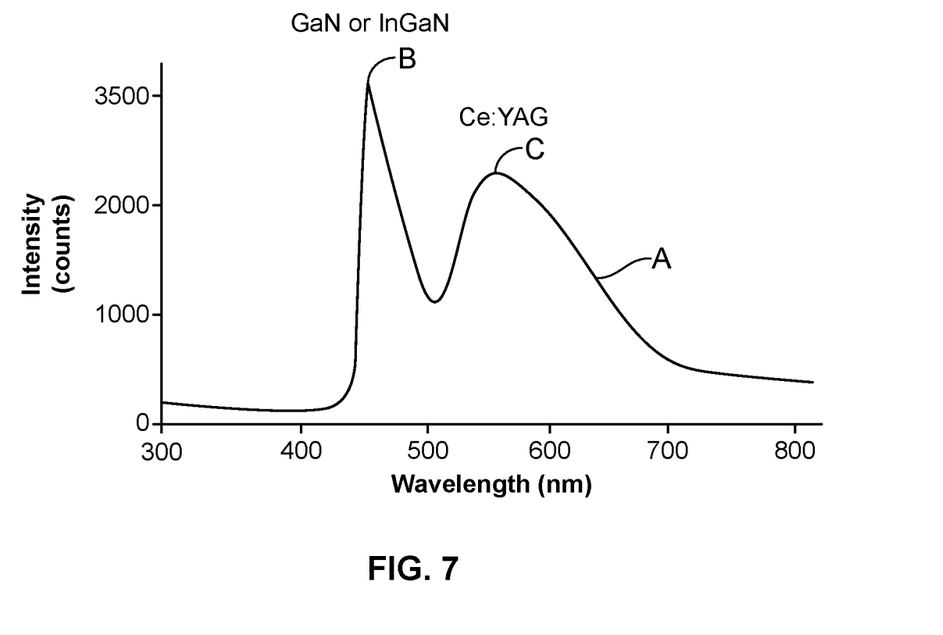
FIG. 7 shows an intensity plot of the spectrum of a white-light produced by the blue light spectrum with the phosphor, according to an embodiment of the present invention.

Referring to FIG. 7, the intensity plot A of the spectrum of a white light produced by the blue light spectrum with the phosphor layer is illustrated. In one embodiment, the spectrum of the white light is produced by the gallium nitride (GaN) or indium gallium nitride (InGaN) blue light with the cerium doped yttrium aluminium garnet (Ce:YAG) phosphor. The peak B of plot A represents the emission of the GaN or InGaN peak wavelength is in a range from 450 nm to 500 nm. In one embodiment, the peak C of plot A represents the emission of the Ce:YAG peak wavelength is in a range from 500 nm and 600 nm.

Figure 8:
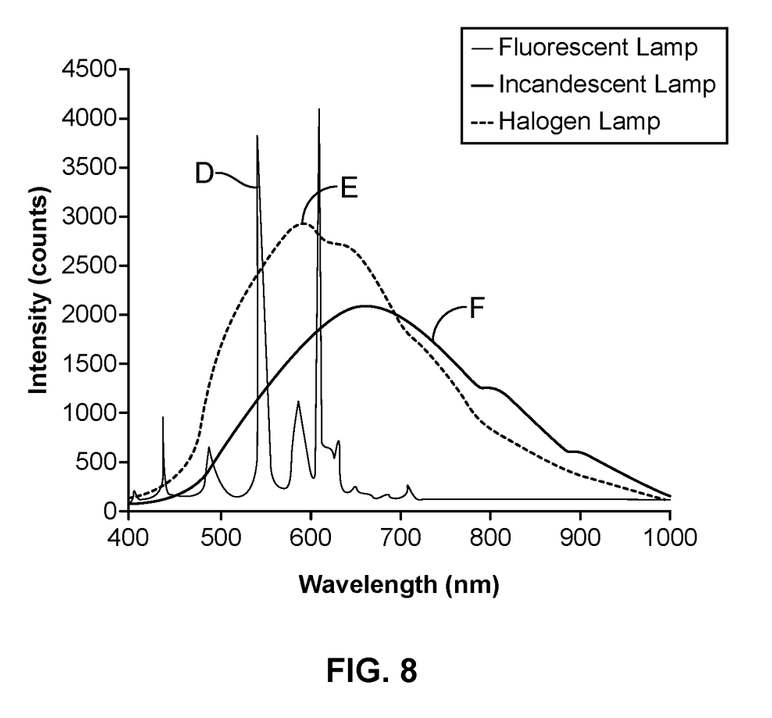
FIG. 8 shows intensity plots of the spectrum of a fluorescent lamp, an incandescent lamp, and a halogen lamp, according to an embodiment of the present invention.

Referring to FIG. 8, the intensity plots (D, E, and F) of the spectrum of a fluorescent lamp, an incandescent lamp, and a halogen lamp is illustrated. In one embodiment, the intensity plots (D, E, and F) of the spectrum shows the distribution of light from three different sources such as the fluorescent lamp, incandescent lamp, and halogen lamp, respectively. The incandescent and halogen lamps give continuous spectra, while fluorescent lamp gives a mix of discrete bands of different wavelengths of light, each of which can be adjusted via UI or GUI based on consumer taste.

Figure 9:
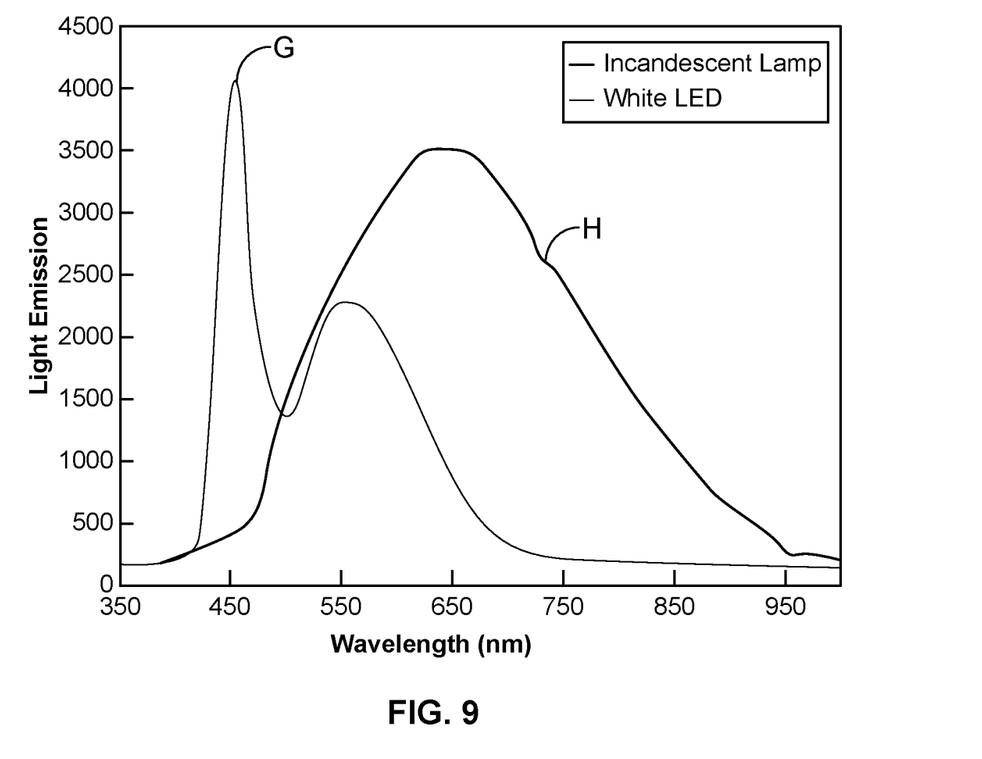
FIG. 9 shows intensity plots of the spectrum of an incandescent lamp and a white LED, according to an embodiment of the present invention.
Figure 10:
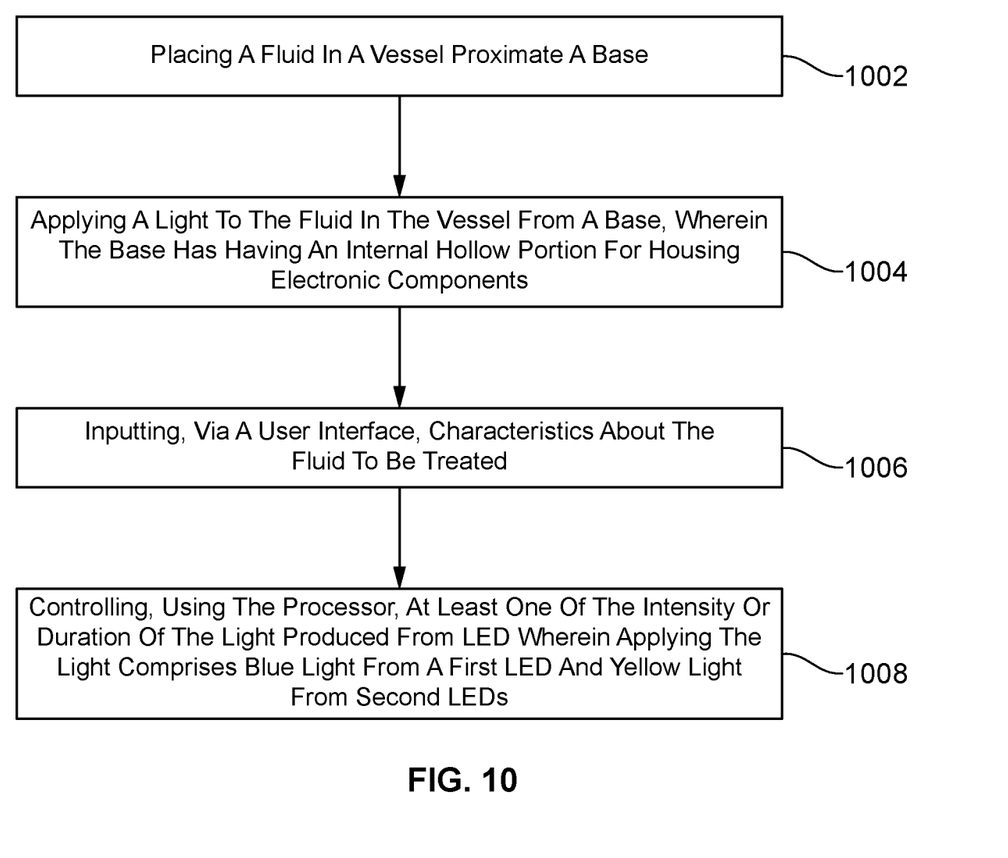
FIG. 10 is a stepwise method diagram showing a method for decanting wine, spirits or coffee according to an embodiment. A description of embodiments of the present invention will now be given with reference to the Figures. It is expected that the present invention may be embodied in other specific forms without departing from its spirits or essential characteristics. The described embodiments are to be considered in all respects only as illustrative and not restrictive.

Referring to FIG. 9, the intensity plots (G and H) of the spectrum of an incandescent lamp and a white LED is illustrated. In one embodiment, the intensity plots (G and H) of the spectrum shows the distribution of light from two different sources such as the incandescent lamp and the white LED, respectively. In one embodiment, the spectrum of the incandescent lamp could produce near-infrared and the wavelength in a range from 460 nm to 560 nm to 1 mm. In one embodiment, the wavelength of the white LED in a range from 470 nm to 520 nm.

According to another embodiment of the present invention, the device 100 further incorporated with a velocity decanting technology by maintaining an optimum speed rotation (OSR) of the movement component placed in the decanter 102. In one embodiment, the velocity decanting technology improves the decanting process of the wine, distilled spirits and coffee in the decanter 102. In one embodiment, the velocity decanting technology with optimum speed rotation of the device 100 is configured to rotate the movement component placed within the wine, distilled spirits, vinegars, juices and coffee, distilled spirits and coffee at optimum speed. In one embodiment, the optimum speed and light treatment achieves the taste, and improve the flavor and quality of the wine, distilled spirits and coffees such as a red, a white, a rose wines and, or a new or pre-opened spirits or coffee.

Importantly, the velocity decanting technology works together with the light treatment to effectively bring all the aspects of the wine, distilled spirits, vinegars, juices and coffee to taste and smell.

The time required for decanting each wine, distilled spirits and coffee, distilled spirits and coffee is different from others using known devices. The most common average decanting times based on the type of wine, distilled spirits, juices, vinegars and coffee. High-tannin, bold red wines, and tight wines like Cabernet Sauvignon, Syrah, and Barolo may take two hours (unless they are more than 20 years old) for decanting the wine. Young light reds like Pinot Noir and Gamay may take 30 minutes to one hour for decanting the wine. Table wine, cheap grocery store reds could usually withstand as much as four hours of decanting and processing, while white wine could handle about an hour or every 30 minutes until it starts to open up. Rich, bold white wine like chardonnay could take about one hour for decanting the wine. Light white wines like pinot grigio take only a few minutes, up to a maximum of 30 minutes for decanting the wine. Champagne could take less than one hour for decanting the wine. This is of course, Older wines that naturally have more intensity (for example, California cabernet sauvignon or Bordeaux) could withstand longer air exposure in the decanter, whereas lighter wines (for example, pinot noir or most burgundy vintages), could not tolerate or bear much decanting process. Alternatively, a younger wine (fewer than 20 years old) could withstand in the decanter for at most four hours without losing its youthful flavors.

In one embodiment, the inventors have found time duration parameter for the decanting process of the wine using the light emitting wine, distilled spirits and coffee decanting device 100. In one embodiment, California cabernet wine may take 10 minutes for bottles to decant the wine up to 20 years old. Bordeaux wine may take 8-10 minutes for bottles to decant the wine up to 20 years old. Burgundy wine may take 1-2 hours for bottles to decant the wine up to 10 years old. Petite Syrah wine may take 2 hours for bottles to decant the wine up to 10 years old. Pinot Noir wine could take 10 minutes for bottles to decant the wine up to 20 years old. Chardonnay wine could take 1-5 minutes for the bottle to decant the wine. In operation, once the user inputs the varietal into the either the GUI or UI, the time and light intensity will automatically populate and run on the decanter based on the above.

In one embodiment, time duration parameter for the decanting process of coffee using the light emitting wine, distilled spirits and coffee decanting device 100. In one embodiment, cold and hot brew coffees may take up to 1 minute and 30 seconds.

In one embodiment, the scotch and whisky could take 5-10 minutes to decant the spirits. Mezcal, Cognac, and rum could take 3-5 minutes to decant the distilled spirits. Tequila could take 4-8 minutes for decanting and it varies for Blanco, or Anejo. Sake could take 2-5 minutes for decanting the spirit. Bourbon may take up to 3 minutes. Rum may take up to 3 minutes for a Rum up to 8 years old. Vodka and Gin may take up to 10 minutes. Brandy may take up 5-10 minutes for a Brandy up to 12 years old. Cognac may take up to 3 minutes for a Cognac up to 6 years old.

In one embodiment, time duration parameter for the decanting process of coffee using the light emitting wine, distilled spirits and coffee decanting device 100. In one embodiment, cold and hot brew coffee may take up to 1 minute and 30 seconds.

The device 100 could evaporate the excessive alcohol and undesirable compounds such as ethanol or sulfites a lot quicker while allowing other flavors to emerge in the wine. The device 100 could remove sediments from the bottle of mature wine. The device 100 could decant the wine quickly and provides a complete and precise flavor to the wine.

Each of the above varietals may also have predetermined light wavelength that is used. A specific light wavelength may be used for certain spirits as well.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A device for light-treating a fluid, the device comprising:
   a base having an internal hollow portion for housing a processor;
   a transparent medium on a top of portion of the base on which a fluid vessel rests;
   a phosphor layer positioned below the transparent medium;
   a light emitting element (LEE) for producing light located in the base and positioned toward the top portion of the based where the fluid vessel rests wherein the LEE comprises a first LEE and a second LEE, and wherein the first LEE is configured to emit blue light and the second LLE is configured to emit yellow light to produce white light;
   a drive shaft connected to the base, wherein the drive shaft extends upwardly into the vessel;
   an impeller connected to the drive shaft, wherein the impeller is configured to generate a vortex in the fluid in the decanter to produce a swirling effect to increase contact between the fluid, air and the light.

2. The device of claim 1, wherein the processor comprises an updatable memory to store the characteristics, and in response to the user inputting the characteristics, the processor sets the LEE to an optimum intensity or duration characteristics comprise type of fluid, varietal, age of wine, or user preference.

3. The device of claim 1, wherein the fluid comprises wine, distilled spirits, vinegars, or juices.

4. The device of claim 1, further comprising:
   a power source;
   a wireless communication interface;
   wherein the processor is in communication with the power source and the wireless communication interface such that the device is connectable to a user's smart device via a network to allow the user input the characteristics on the user's smart device.

5. The device of claim 1, further comprising an insulation layer proximate the transparent medium, wherein the insulation layer prevents at least a portion of heat from the LEE from reaching the fluid vessel, wherein the insulation layer is formed of a transparent material that allows light incident to pass through without changing the characteristics of the light.

6. The device of claim 1, wherein the drive shaft is powered by a motor and the processor.

7. The device of claim 1, wherein the LEE produces a spectrum of the white light that is produced by a gallium nitride (GaN) or indium gallium nitride (InGaN) blue light with a cerium doped yttrium aluminium garnet (Ce:YAG) phosphor and an emission of the Ce:YAG.

8. The device of claim 1, wherein the emission spectrum of blue light from the LED via the phosphor layer generates a white light spectrum.

9. A system for light-treating a fluid, the system comprising:
   a smart device associated with a user, wherein the smart device comprises a graphical user interface (GUI) for inputting characteristics about the fluid to be treated;
   a network in communication with the smart device via wireless protocol;
   a device to light-treat a fluid comprising:
      a base having an internal hollow portion for housing electronic components;
      a transparent medium on a top of portion of the base on which a fluid vessel rests;
      a phosphor layer positioned below the transparent medium;
      a light emitting element (LEE) for producing light located in the base and positioned toward the top portion of the based where the fluid vessel rests, wherein the LEE comprises a first LEE and a second LEE, and wherein the first LEE is configured to emit blue light and the second LLE is configured to emit yellow light to produce white light;
      a drive shaft connected to the base, wherein the drive shaft extends upwardly into the vessel;
      an impeller connected to the drive shaft, wherein the impeller is configured to generate a vortex in the fluid in the decanter to produce a swirling effect to increase contact between the liquid, air and the light.

10. The system of claim 9, wherein the processor comprises an updatable memory to store the characteristics, wherein the characteristics comprise type of fluid to be treated, varietal, or vintage, and in response to the user inputting the characteristics, the processor sets the LEE to the optimum intensity or duration that is optimized to treat the fluid based on the characteristics. wherein the characteristics comprise type of fluid, varietal, age of wine, or user preference.

11. The system of claim 9, wherein the fluid comprises wine, distilled spirits, vinegars, or juices.

12. The system of claim 9, further comprising:
   a power source;
   a wireless communication interface;
   wherein the processor is in communication with the power source and the wireless communication interface such that the device is connectable to the user's smart device via a network to allow the user to make inputs on the user's smart device.

13. A method for light-treating a fluid, the method comprising:
   placing a fluid in a vessel proximate a base;
   driving an impeller with the vessel via a drive shaft connected to the base, wherein the drive shaft extends upwardly into the vessel;
   generating a vortex in the fluid in the decanter using an impeller connected to the drive shaft to produce a swirling effect to increase contact between the liquid, air and the light;
   applying, a blue light using a first light emitting element (LEE) and a yellow light using a second LEE to the fluid in the vessel to produce white light;
   inputting, via a user interface, characteristics about the fluid to be treated using an updatable memory located in the base;
   in response to the user inputting the characteristics, setting the LEE to an optimum intensity or duration characteristics based on a type of fluid in the vessel.

14. The method of claim 13, further comprising:
   communicating over the network via a smart device associated with a user, characteristics about the fluid to be treated.

15. The method of claim 13, further comprising passing light though a transparent medium on a top of portion of the base on which a fluid vessel rests.

16. The method of claim 13, wherein the LEE produces spectrum of the white light that is produced by a gallium nitride (GaN) or indium gallium nitride (InGaN) blue light with a cerium doped yttrium aluminium garnet (Ce:YAG) phosphor and an emission of the Ce:YAG.

* * * * *